United States Patent [19]
Christensen et al.

[11] Patent Number: 5,617,419
[45] Date of Patent: Apr. 1, 1997

[54] ADAPTING SWITCH PORT AND WORK STATION COMMUNICATION ADAPTERS TO DATA FRAME TYPES WITH DISPARATE FORMATS AND DATA RATES

[75] Inventors: Kenneth J. Christensen, Apex; Lee C. Haas, Raleigh; Francis E. Noel, Durham, all of N.C.

[73] Assignee: International Business Machines Corporation, Armonk, N.Y.

[21] Appl. No.: 309,522

[22] Filed: Sep. 20, 1994

[51] Int. Cl.$^6$ .................................................... H04J 3/16
[52] U.S. Cl. ............................................ 370/471; 370/506
[58] Field of Search ................................. 370/82, 83, 84, 370/60, 79, 94.1, 99, 101, 102, 105.1

[56] References Cited

U.S. PATENT DOCUMENTS

| | | | |
|---|---|---|---|
| 4,368,512 | 1/1983 | Kyu et al. | 364/200 |
| 5,189,411 | 2/1993 | Collar et al. | 370/102 |
| 5,357,514 | 10/1994 | Yoshida | 370/102 |
| 5,371,736 | 12/1994 | Evan | 370/83 |
| 5,412,650 | 5/1995 | Davies | 370/82 |

*Primary Examiner*—Douglas W. Olms
*Assistant Examiner*—Shick Hom
*Attorney, Agent, or Firm*—Joscelyn G. Cockburn; Homer L. Knearl

[57] ABSTRACT

This invention relates to "clear pipe" communication networks meaning the nodes and links handle a variety of data frame types depending on their communication protocols such as Token Ring, Ethernet, FDDI or ATM. More particularly, this invention relates to node/link interface adapters at nodes which include switching nodes and end nodes. The adapters identify data frame type and adapt the node/link adapter operative elements to handle the various types of data frames as they travel through the network.

The invention identifies the frame type at the source, flags the frame type to the nodes by use of unique SDEL (start delimiter) symbols or codes, uses the SDEL codes as received with the frame at each node to find the destination address in the frame and to adjust the transmission rate for the frame. The transmission rate is adjusted by inserting null non-data symbols in the frame to effectively slow the data rate to the data rate capacity of the protocol.

16 Claims, 11 Drawing Sheets

FIG. 3A

| CMD | MEANING |
|-----|---------|
| 00  | DATA    |
| 01  | NULL    |
| 10  | GAP     |
| 11  | NOT USED |

FIG. 3B

| TYPE | MEANING |
|------|---------|
| 000  | TOKEN RING (16 Mbps) |
| 001  | ETHERNET (10 Mbps) |
| 010  | FDDI (100 Mbps) |
| 011  | ATM (100 Mbps) |
| 1XX  | NOT USED |

FIG. 6A

| TRANSITION NO. | CONDITION | ACTION |
|---|---|---|
| 1 | TX FIFO NOT EMPTY | SEND ONE DATA WORD OR DELIMITER SYMBOL |
| 2 | UNCONDITIONAL | SEND NINE NULL SYMBOLS |
| 3 | TX FIFO EMPTY | SEND GAP SYMBOL |
| 4 | TX FIFO NOT EMPTY | SEND ONE DATA WORD OR DELIMITER SYMBOL |

FIG. 6B

| TRANSITION NO. | CONDITION | ACTION |
|---|---|---|
| 1A, 1B, 1C, 1D | TX FIFO NOT EMPTY | SEND ONE DATA WORD OR DELIMITER |
| 2A, 2B, 2C | UNCONDITIONAL | SEND FIVE NULL SYMBOLS |
| 2D | UNCONDITIONAL | SEND SIX NULL SYMBOLS |
| 3A, 3B, 3C, 3D | TX FIFO EMPTY | SEND GAP SYMBOL |
| 4 | TX FIFO NOT EMPTY | SEND ONE DATA WORD OR DELIMITER |

FIG. 9A

| HALF BYTE OR DATA NIBBLE | | | | CODE WORD | | | | |
|---|---|---|---|---|---|---|---|---|
| 0 | 0 | 0 | 0 | 1 | 0 | 1 | 0 | 1 |
| 0 | 0 | 0 | 1 | 0 | 1 | 0 | 0 | 1 |
| 0 | 0 | 1 | 0 | 0 | 1 | 0 | 1 | 0 |
| 0 | 0 | 1 | 1 | 0 | 1 | 0 | 1 | 1 |
| 0 | 1 | 0 | 0 | 0 | 0 | 1 | 1 | 1 |
| 0 | 1 | 0 | 1 | 0 | 1 | 1 | 0 | 1 |
| 0 | 1 | 1 | 0 | 0 | 1 | 1 | 1 | 0 |
| 0 | 1 | 1 | 1 | 0 | 1 | 1 | 1 | 1 |
| 1 | 0 | 0 | 0 | 1 | 0 | 0 | 1 | 0 |
| 1 | 0 | 0 | 1 | 1 | 1 | 0 | 0 | 1 |
| 1 | 0 | 1 | 0 | 1 | 1 | 0 | 1 | 0 |
| 1 | 0 | 1 | 1 | 1 | 1 | 0 | 1 | 1 |
| 1 | 1 | 0 | 0 | 1 | 0 | 1 | 1 | 1 |
| 1 | 1 | 0 | 1 | 1 | 1 | 1 | 0 | 1 |
| 1 | 1 | 1 | 0 | 1 | 1 | 1 | 1 | 0 |
| 1 | 1 | 1 | 1 | 1 | 1 | 1 | 1 | 1 |

FIG. 9B

| FRAME CODE | ESC-CODEWORD | MEANING |
|---|---|---|
| 1 0000 0000 | 00010 - 01010 | PREFIX DELIMITER |
| 1 0000 0001 | 00010 - 01011 | SDEL - TOKEN RING DELIMITER |
| 1 0000 0010 | 00010 - 00111 | SDEL - ETHERNET DELIMITER |
| 1 0000 0011 | 00010 - 01101 | SDEL - FDDI DELIMITER |
| 1 0000 0100 | 00010 - 01110 | SDEL - ATM DELIMITER |
| 1 0000 1101 | 00010 - 01111 | EDEL |
| 1 0000 1110 | 00010 - 10101 | NULL |
| 1 0000 1111 | 00010 - 01001 | GAP |

ADAPTING SWITCH PORT AND WORK STATION COMMUNICATION ADAPTERS TO DATA FRAME TYPES WITH DISPARATE FORMATS AND DATA RATES

BACKGROUND OF THE INVENTION

1. Field of the Invention

This invention relates to "clear pipe" communication networks meaning the nodes and links handle a variety of data frame types, depending on their communication protocols, such as Token Ring, Ethernet, FDDI or ATM. More particularly, this invention relates to node/link interface adapters at nodes which include switching nodes and end nodes. The adapters identify data frame type, and adapt the node/link adapter operative elements to handle the various types of data frames as they travel through the network.

2. Description of Related Art

In data processing communication networks within a campus of buildings, the predominant communication protocols are Token Ring, FDDI, and Ethernet. There is also a new communication protocol known as ATM (Asynchronous Transfer Mode). The data frame format used by each of these communication protocols is shown in FIGS. 1A, 1B, 1C and 1D.

In FIG. 1A, the Token Ring data frame format begins with a Start Delimiter SD which is an octet (8 bits). The SD is followed by the Access Control AC and the Frame Control FC which are also octets. The SD and AC are referred to together as the Start-of-Frame Sequence SFS. After the FC, there is the Destination Address DA and Source Address and the optional Routing Information RI. Each of the addresses is 6 octets in length. The Information INFO, or data carried by the frame, follows the routing information, and may be 0 (zero) to many octets in length. After the INFO comes the Frame Check Sequence FCS. The FCS is 4 octets long, and is used to check the data frame from FC through FCS for errors in transmission. The Token Ring data frame ends with End Delimiter ED and the Frame Status FS which are referred to as the End-of-Frame Sequence EFS. The content of the frame between Start Delimiter SD and End Delimiter ED is referred to herein as payload.

The FDDI data frame format is shown in FIG. 1B where the SFS (Start of Frame Sequence) contains a preamble followed by SD (Start Delimiter). The payload includes in sequence, the Frame Control FC, the Destination Address DA, the Source Address SA, the Information INFO, and the Frame Check Sequence FCS. In FDDI, the FCS covers the payload. The End-of-Frame Sequence EFS includes the End Delimiter ED and the Frame Status FS.

The Ethernet data frame format in FIG. 1C also begins with a Preamble and Start Delimiter SFD. The payload follows the SFD, and contains in sequence the Destination Address, the Source Address, the frame Length, the Data, the PAD (0's placed in the frame if necessary to bring the frame to the minimum required size), and the Frame Check Sequence. There is no End Delimiter since the frame Length defines the end of the frame.

In FIG. 1D, the ATM cell structure or frame is shown. It is a very simple structure having only two parts, Header and Information. The Header contains virtual path and channel identifiers, and various control bits. The virtual path and channel identifiers are used to route an ATM cell through an ATM network from source to destination.

The two most significant problems in handling all of these data frame types in one network are (1) how to find the destination address in each frame as the frame is processed at each node, switch port or work station, and (2) how to match the transmission rate of the frame to data rate of the node.

SUMMARY OF THE INVENTION

It is an object of this invention to provide a "clear pipe" communication network.

In accordance with this invention, the above problems with "clear pipe" communications are solved by identifying the frame type at the source, flagging the frame type to the nodes by use of unique SDEL (start delimiter) symbols or codes, using the SDEL codes, as received with the frame at each node, to find the destination address in the frame, and to adapt the data frame to the transmission rate of the network. The data frame is adapted by inserting null non-data symbols in the frame at a data rate compatible with the data rate of the communication network.

Some advantages of inserting nulls (NULL stuffing) are compatibility for applications and cut-through switching. Consider an application tested and working in a 10-Mbps Ethernet environment. Now, if the environment is upgraded to 100-Mbps, the application may not work anymore (due to overflows, timing problems, etc.). NULL stuffing allows for a 100-Mbps line to provide a 10-Mbps protocol data rate in this example. Cut-through applies to a switch in the network where a destination network may be 10-Mbps line data rate. With NULL stuffing, a 100-Mbps line can properly cut-through the switch to the slower 10-Mbps line.

The great advantage of the invention is that one network can handle all of the common communication data frame formats. Other objects and features of the invention will be understood by those of ordinary skill in the art after referring to the complete written description of the preferred embodiments of the invention.

BRIEF DESCRIPTION OF DRAWINGS

FIG. 3A is a table of command codes used in the adapter of FIG. 2.

FIG. 3B is a table of data frame type codes used in the adapter of FIG. 2.

FIGS. 6A and 6B are tables of transitions and conditions for the FSMs in FIGS. 5A and 5B, and null/gap actions resulting at the null/gap logic in FIG. 4C.

FIGS. 9A and 9B correspond to code conversion tables 59 and 61 in FIG. 8.

DESCRIPTION OF THE PREFERRED EMBODIMENTS

Figure 1A:
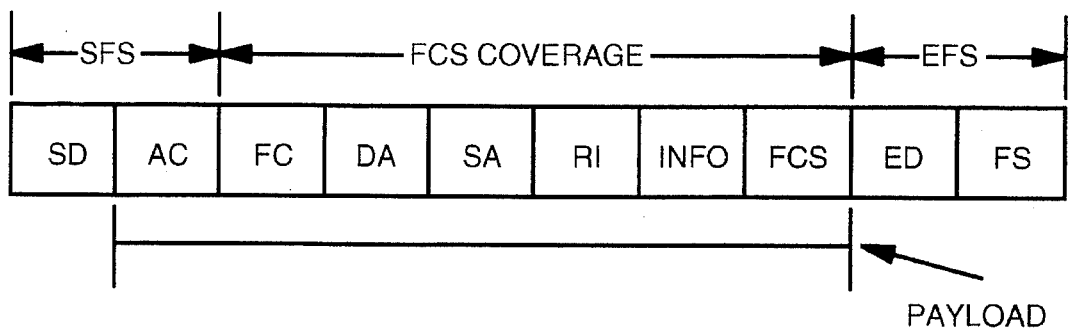
FIG. 1A shows the format of a Token Ring data frame.
Figure 1B:
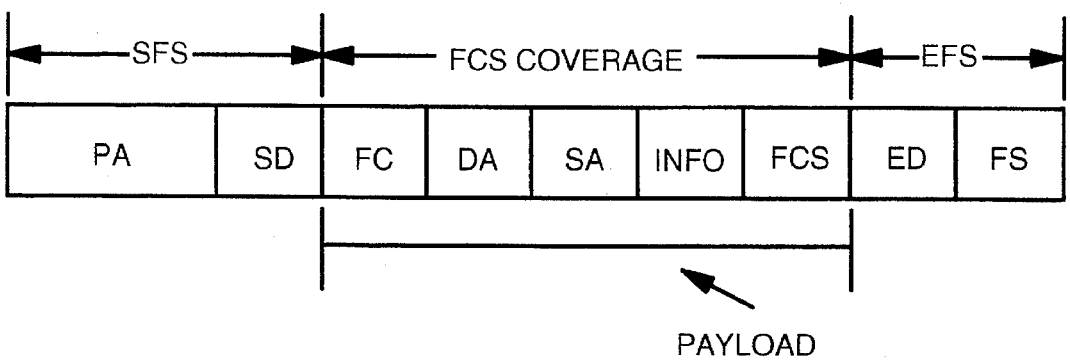
FIG. 1B shows the format of a FDDI data frame.
Figure 1C:
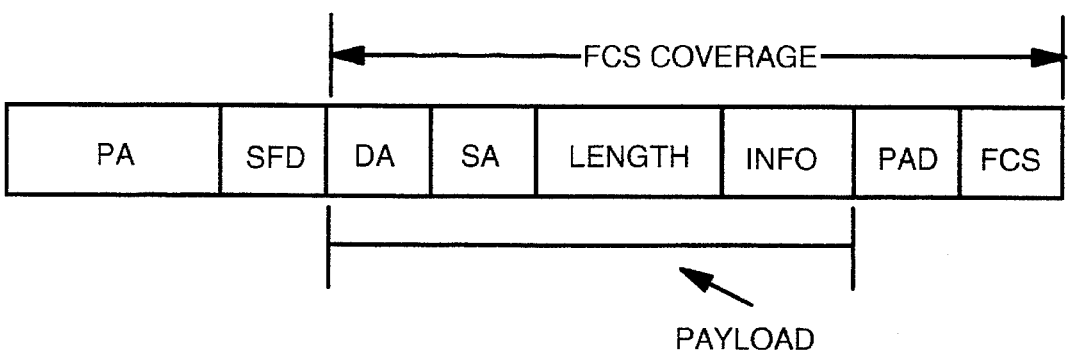
FIG. 1C shows the format of an Ethernet data frame.
Figure 1D:
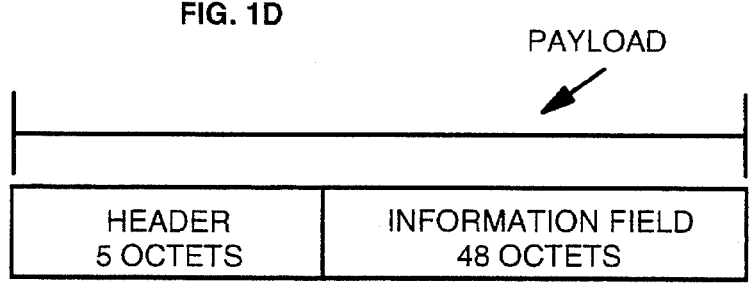
FIG. 1D shows the format of an ATM cell.
Figure 2:
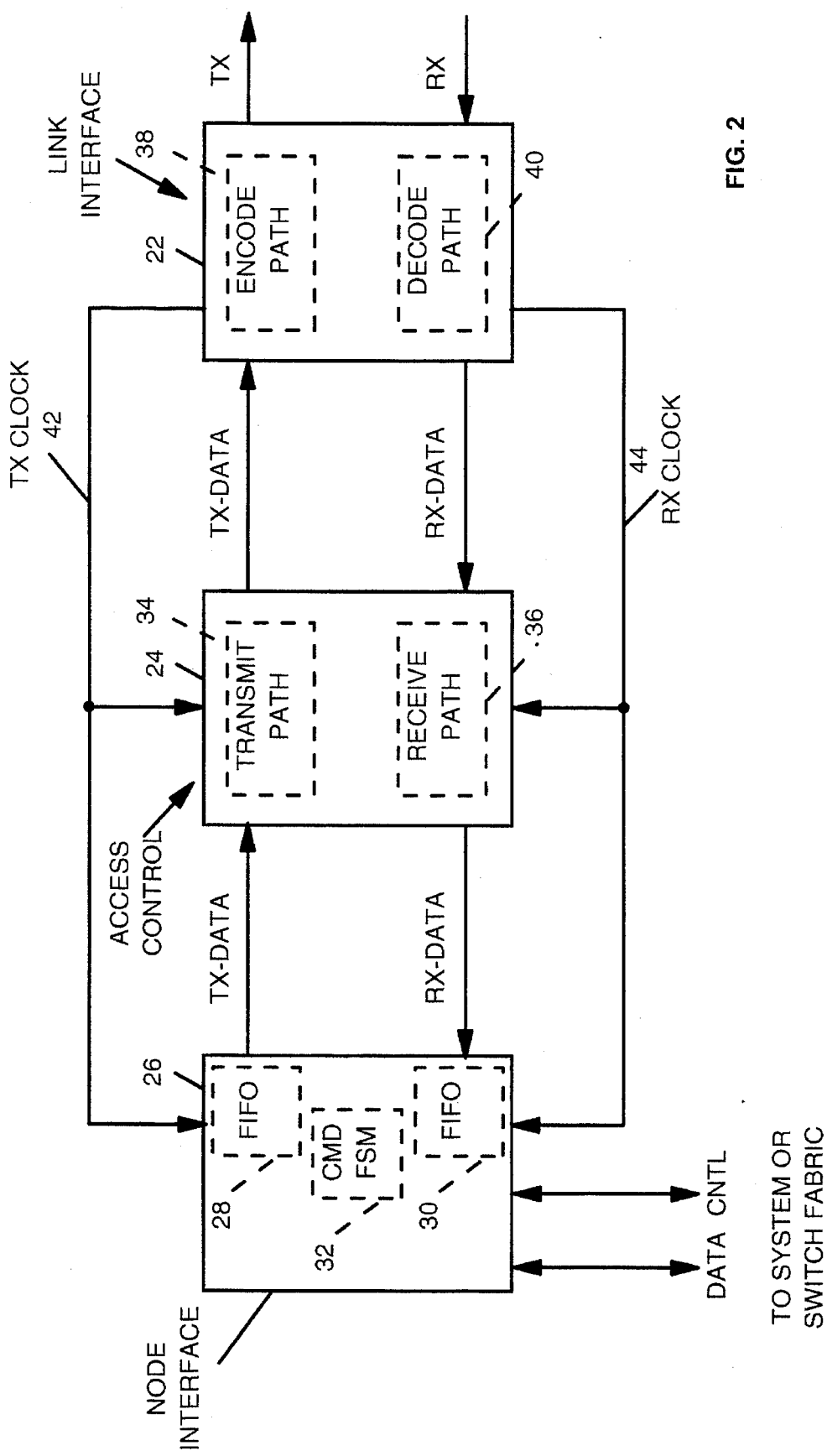
FIG. 2 shows an node/link adapter for use in adapting the operative elements of a node to handle the data frame in accordance with the type of data frame.

FIG. 2 illustrates the node/link interface adapter. The adapter is located at both an end node; i.e., work station or host computer and at switching node in the network. It contains three basic functional elements; a link interface 22, an access control 24 and a node interface 26. If the adapter is at an end node, it has a computing system interface which interfaces with the data and control lines to a host computer or work station. For example, these lines would be the ISA bus in a personal computer, or a MICROCHANNEL bus in a PS/2 computer or an RS/6000 work station. In a computer or work station, the adapter would usually be implemented as a communication adapter card. If the adapter is located at a network node, it is a switch port at a concentrator, and has a switch fabric interface which interfaces to the data transfer unit, or switch fabric, of the concentrator.

Node interface 26 contains FIFO buffers 28 and 30, and command logic including Command Finite State Machine (FSM) 32. The FIFO buffers are used to accumulate a transmit portion of each frame for transmission to another node, or to accumulate a receive portion of each data frame for processing at the present node. The node interface identifies the data frame type and, based on data frame type, inserts null codes in data frames or gap codes between data frames as necessary to match data rate of the frame to data rate of the receiving link or node. The insertion of null codes into the frame affectively stretches the data frame, and thereby matches the frame and network data rates. If the source node is an end node where the data frame originates, the node interface also interprets data frame descriptors from the source computer or work station and generates the SDEL (start delimiter) codes which indicate the data frame type. These SDEL codes will be used at receiving switch nodes and receiving end nodes to identify the received data frame type. The node interface will be described in more detail in reference to FIG. 4A.

Figure 7A:
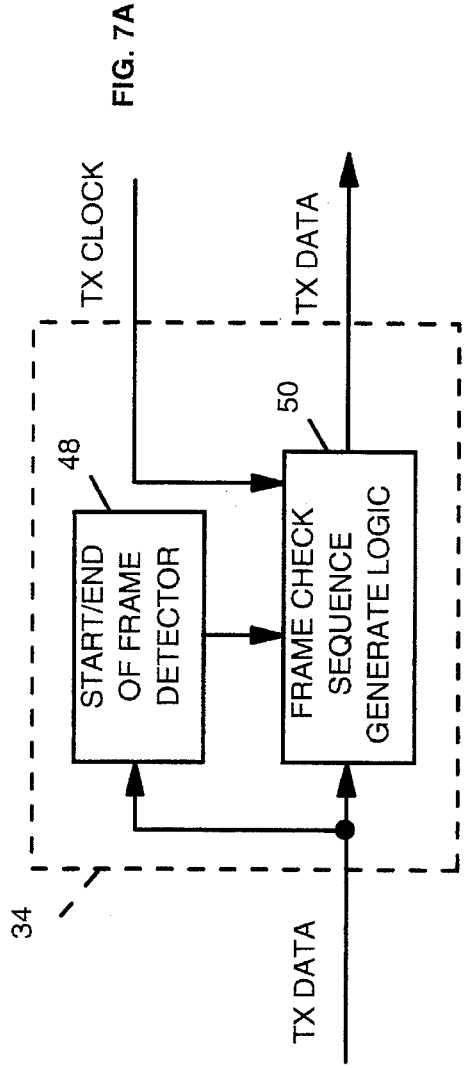
FIG. 7A shows the implementation of the transmit path 34 in FIG. 2.

In FIG. 2, the transmit path 34 of access control 24 contains frame check sequence generation logic (FIG. 7A for inserting data check codes in the transmitted data frame. In receive path 36, the access control includes address matching and frame check sequence checking. A transmitting node inserts the frame check sequence, and a receiving node checks the sequence. If the sequence does not check at the receiving node, an end of bad frame code is set for the bad data frame. The address matching in the receive path simply identifies those frames to be processed by the node. If there is an address mismatch, the frame is blocked from the node interface 26. Access control 24 is shown in detail in FIGS. 7A and 7B which are described hereinafter.

Link interface 22 includes the encoding/decoding logic, as well as the line driver and receiver. The encode path 38 encodes the 9-bit (eight bits plus a data or non-data tag bit) TX-Data stream containing data and non-data symbols into a 4/5 code for transmission over the communication link. The non-data symbols are the prefix delimiter, start delimiter and end delimiter codes, the null code and the gap code. The decode path 40 decodes the 4/5 code back into an RX-Data stream containing 9-bit data words and non-data symbols. The non-data symbols are decoded into delimiter, null and gap codes. The decode path separates or strips the null codes from the RX-Data. Thus, the effect of the decode path is to compress the stretched frame that was transmitted back to true data frame size for data processing at the node. In this way, the data rate of the transmitted data frame may be adapted to the data rate of the communication protocol for the data frame type. Link interface 22 is described in detail hereinafter with reference to FIG. 8.

In FIG. 2, the TX-Data and RX-Data buses or connections between node interface 26, access control 24 and link interface 22 carry 9-bits in parallel. The data and control bus out of the node interface 26 to the system or switch fabric carry parallel bits, but the number of parallel bits depends on the size of the bus. Line 42 carries the Transmit (TX) Clock signal generated at the encode path in link interface 22. Line 44 carries the Receive (RX) Clock. The RX Clock is recovered from the received data. The TX Clock and RX Clock signals are used in clocking the data through the adapter.

Figure 4A:
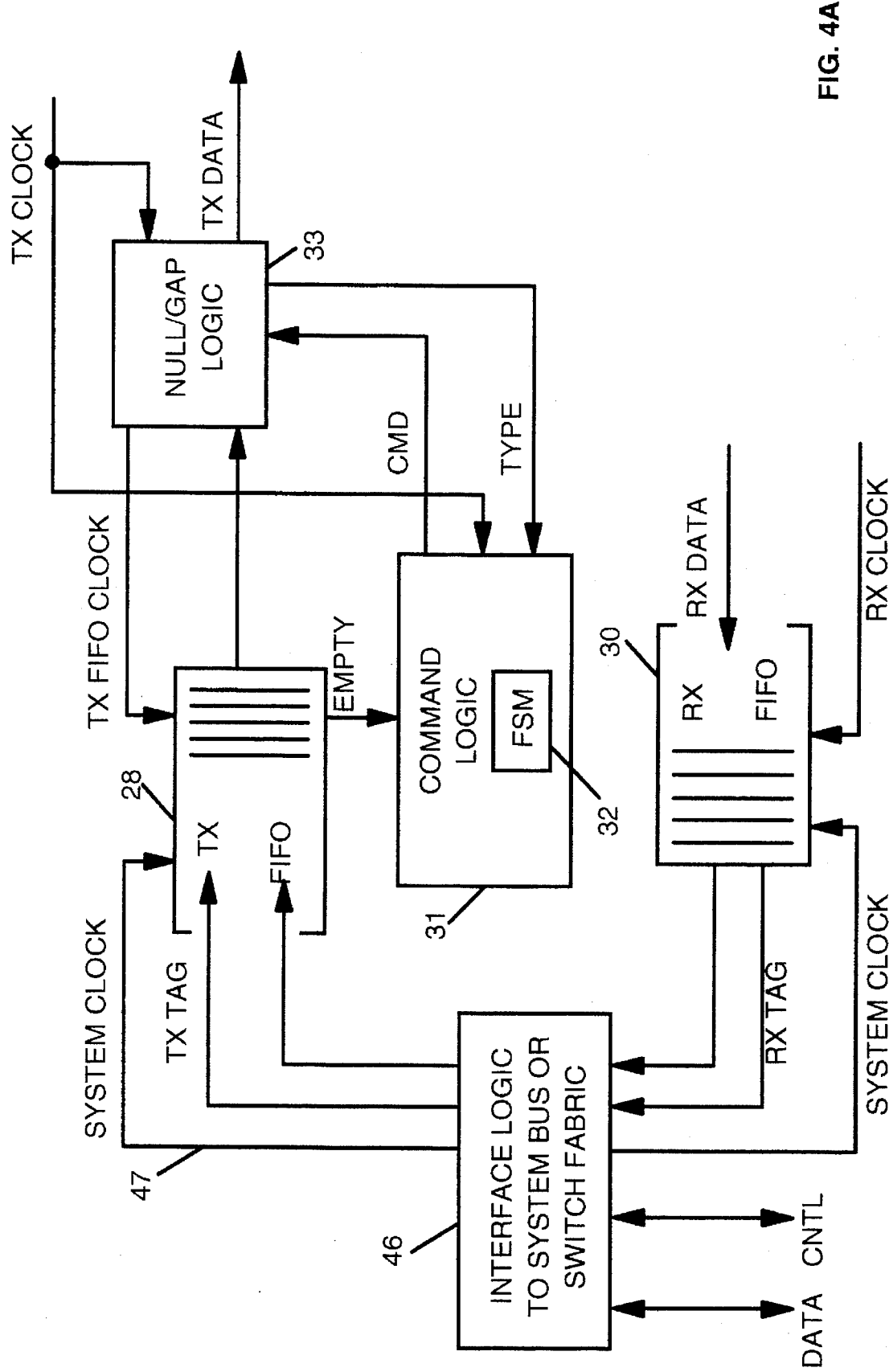
FIG. 4A shows the details of the node interface 26 in FIG. 2.

In FIG. 4A, the node interface comprises TX FIFO buffer 28, RX FIFO buffer 30, command logic 31 including Finite State Machine (FSM) 32, null/gap logic 33 and interface logic 46. Interface logic 46 interconnects the data and control bits at the node to the FIFO buffers 28 and 30 and the command logic 31. Command logic 31, including FSM 32, may be implemented as a programmed microprocessor or as hardwired logic. Usually, hardwired logic is preferred because of its speed of operation.

The nodes are transmitting and receiving (full-duplex) asynchronously over separate transmission lines so the TX FIFO buffer 28 and the RX FIFO 30 may be actively worked in parallel in accordance with the protocols of system bus (if end node) or switch fabric (if a switching node). The TX- and RX-Data streams in the adapter are built with nine-bit words composed of eight-bit bytes (octets) plus a tag bit. The nine-bit words are defined in accordance with the following convention:

0 XXXX XXXX=Data—data octet plus "0" tag bit;

1 0000 0000=Prefix Delimiter (PDEL);

1 0000 0001=SDEL (Start Delimiter) for Token Ring frame;

1 0000 0010=SDEL for Ethernet frame;

1 0000 0011=SDEL for FDDI frame;

1 0000 0100=SDEL for ATM cell;

1 0000 1110=Null;

1 0000 1111=Gap; and 1 1111 1111=End of Bad Frame.

In other words, if the tag bit is a zero, the octet is data. If the tag bit is one, the octet is a non-data symbol. The end of bad frame code symbol, 1 1111 1111, is generated at the receive path 36 in access control 24, and the generation will be described in more detail later herein.

Figure 4B:
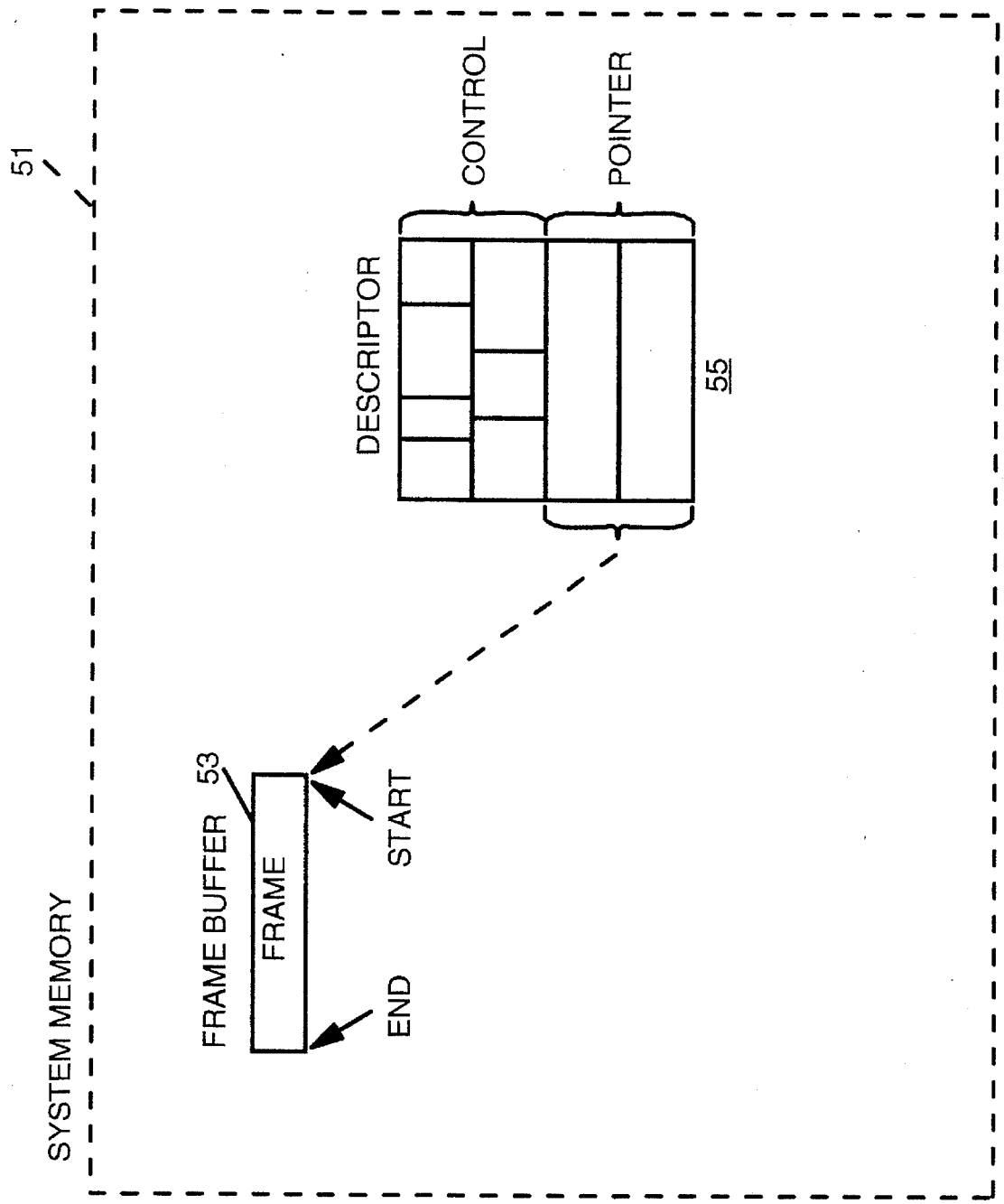
FIG. 4B illustrates the storage of a data frame in system memory.

The SDEL non-data symbols are generated by the interface logic 46 at the source end node. The interface logic 46 queries the desciptor in system memory for the frame in the frame buffer in system memory. FIG. 4B is a schematic representation of system memory 51 containing a frame in frame buffer 53. Descriptor 55, also in system memory 51, contains control information and a pointer to the start of frame in frame buffer 53. The control information in the descriptor 55 contains the frame type information decoded by the interface logic 46 to generate the PDEL and SDEL non-data symbols. PDEL is a prefix delimiter which is followed by a special field and then followed by an SDEL and payload. The special field can contain frame type bits, frame priority bits, and/or other fields specific to network operation.

The octet with the TX tag bit is clocked into the TX FIFO as a 9-bit word with the system clock, or switching node clock on line 47. The 9-bit words in the FIFO are clocked out to the null/gap logic 33 with a gated TX Clock signal from the null/gap logic. The null/gap logic decodes the data frame type from the SDEL non-data symbols, and provides this information to command FSM 32. Command FSM 32 issues the data, null and gap commands that tell the null/gap logic when to output nine-bit data words as TX-data and when to insert null or gap non-data symbols into the TX-Data stream. The tables in FIG. 3A and 3B illustrate the command codes and data frame type codes exchanged between command logic 31 and null/gap logic 33 in the preferred embodiment of the invention. The command FSM states, input conditions and actions are described hereinafter with reference to FIGS. 6A and 6B.

Figure 4C:
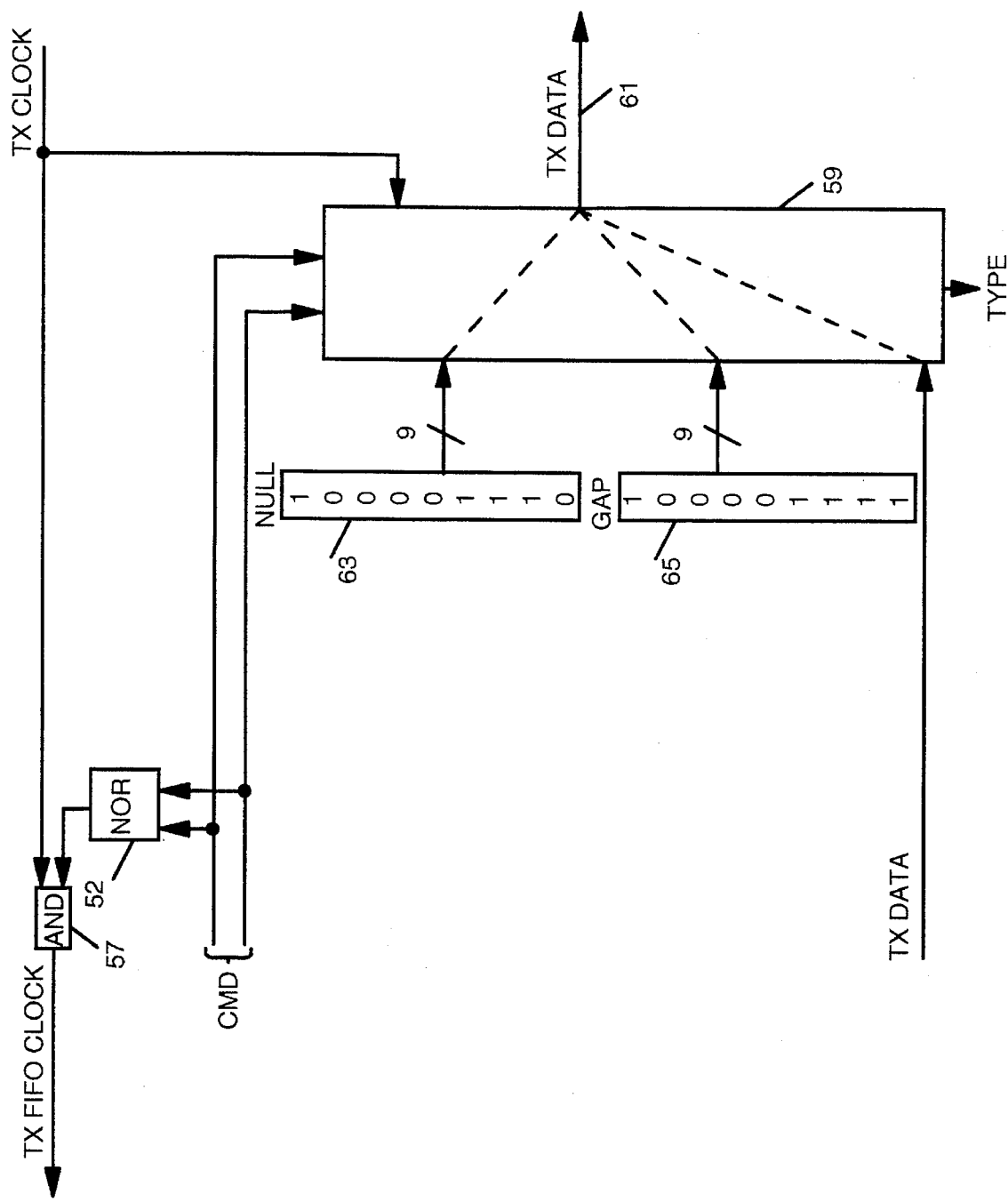
FIG. 4C shows the details of the null/gap logic 33 in FIG. 4A.

The null/gap logic (33 in FIG. 4A) is shown in detail in FIG. 4C. NOR 52 monitors the two-bit commands (FIG. 3A) received from command logic 31. If the command is 00, NOR 52 enables AND 57 to pass the TX Clock signal as the TX FIFO Clock signal to TX FIFO 28. In response to TX FIFO clock, TX FIFO buffer 28 (FIG. 4A clocks out the TX data nine-bit words to multiplexer/decoder 59.

One decoding operation of the multiplex/decoder 59 is to decode or detect the data frame type from the delimiter codes or symbols. In the preferred embodiment, the delimiter codes for each frame type are unique, as described above. Therefore, the frame type decoding would simply look at the unique nine-bit word for each frame type delimiter and generate a frame type code (FIG. 3B) to pass back to the command logic 31 (FIG. 4A). In an alternative embodiment, the frame type information could be in data words in a special field following a generic start delimiter symbol. In this method of decoding, the decoder would look for the SDEL symbol, and then read the special field data words following the SDEL to detect the frame type. Yet another method for frame type identification, the PDEL (Prefix delimiter) could be used to define the start of an identification field. In this method, the decoder would look at the identification data words following a PDEL to identify the data frame type. It will be appreciated by one skilled in the art that other methods and patterns for the PDEL, SDEL and special fields might be decoded by multiplexer/decoder 59 to generate the data frame type codes sent to command logic 31.

The multiplexer/decoder 59 also decodes commands from the command logic 31 to control the multiplexing or switching operation between data and non-data symbols. When the command "00" is decoded, indicating data is to be sent, the multiplexer passes the nine bit data words received from the TX FIFO out on line 61 to the access control 24 (FIG. 2). If the command is anything other than "00", NOR 52 inhibits AND 57, which blocks the TX Clock from reaching TX FIFO buffer 28. Then, TX FIFO does not output the TX data nine-bit words.

When the command is a null command "01", multiplexer 9 decodes the command and gates out the contents of register 63 on line 61. Register 63 contains the null nine-bit symbol "1 0000 1110". When the command is a gap command "10", multiplexer 59 decodes the command and gates out the contents of register 65 on line 61. Register 65 contains the gap nine-bit symbol "1 0000 1111". In effect, the null gap logic, in response to null and gap commands from the command logic 31, shuts off the sending of TX data words, and inserts into the TX DATA stream null or gap symbols in place of the TX data words.

Asynchronous with TX data flowing from TX FIFO 28 in FIG. 4A, RX data is clocked into the RX FIFO buffer 30 by the RX clock signal. The RX data 8-bit octets (i.e., without the tag bit) are passed onto the system bus or the switch fabric when clocked out of the RX FIFO by the system, or switch fabric, clock.

Figure 5A:
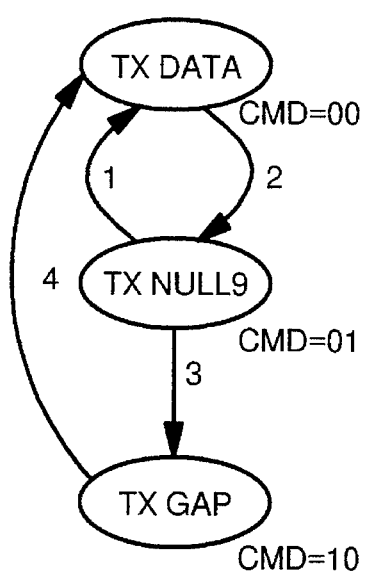
FIGS. 5A and 5B are state/transition diagrams of the Finite State Machine (FSM) in command logic 31 in FIG. 4A.
Figure 5B:
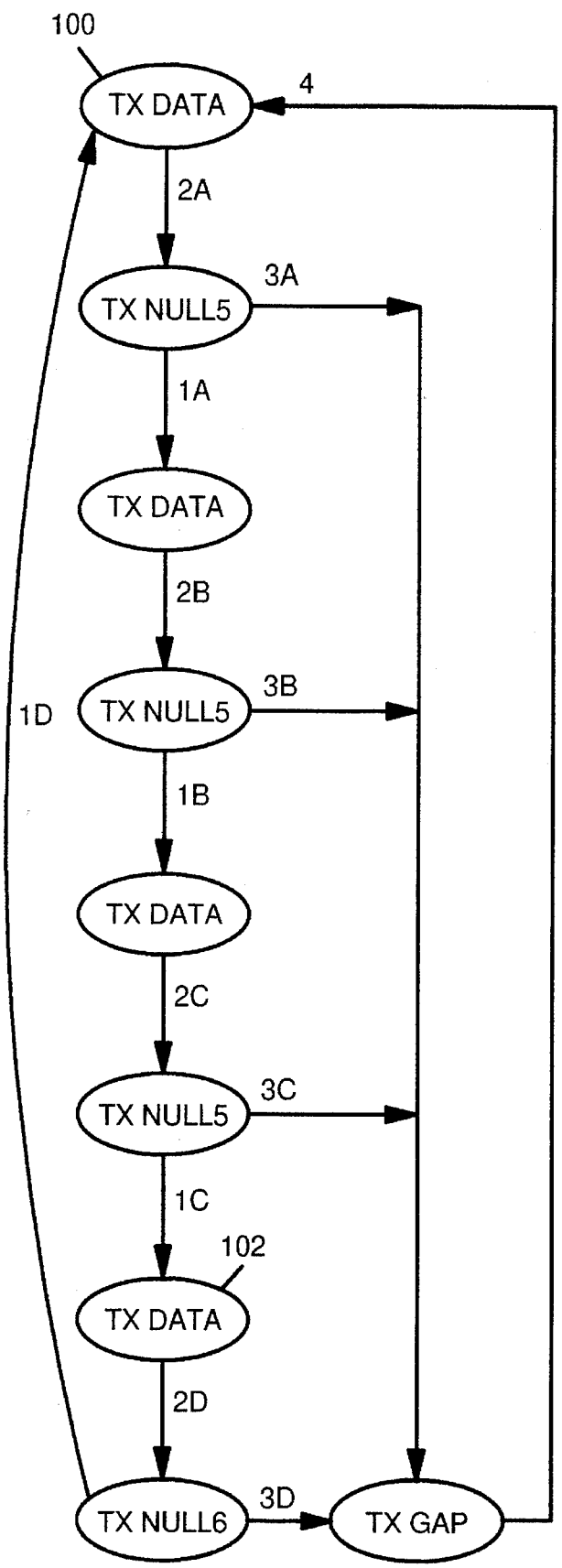

Command FSM 32 is illustrated in state/transition diagrams in FIGS. 5A and 5B. The transitions between states for the state diagram of FIG. 5A are shown in FIG. 6A and for the state diagram of FIG. 5B are shown in FIG. 6B. Command FSM 32 may be viewed as two FSMs—one FSM (FIG. 5A) for converting the effective data transmission rate from 100 Mbps (Mega bits per second) to 10 Mbps and the second FSM (FIG. 5B) for converting the effective data transmission rate from 100 Mbps to 16 Mbps. The command logic 31 (FIG. 4A) interfaces between the FSMs and the TX FIFO 28, the RX FIFO 30 and the null/gap logic 33. The command logic controls the clocking of the interpretation of the empty condition from TX FIFO 28, the clocking of the commands to the null/gap logic and the decoding of the data frame type codes from the null/gap logic to select the appropriate FSM, FIG. 5A or FIG. 5B.

When the frame type is Ethernet 10 Mbps, the type code is "001" (FIG. 3A), and command logic 31 selects FIG. 5A FSM. In FIG. 5A, there are three states for the FSM. TX DATA state generates command "00", which results in null/gap logic sending one nine-bit data word or a delimiter symbol from the TX FIFO to the access control 24 (FIG. 2). TX Null 9 state generates command "01" nine times which results in the null/gap logic sending out nine null symbols. TX GAP state generates command "10" which results in the null gap logic sending out a gap symbol.

The numbered transitions defined in FIG. 6A define the input conditions that trigger the corresponding transition in FIG. 5A, and result in action at the null/gap logic. In transitions 1 and 4, TX FIFO is not empty, and the FSM transitions to TX DATA state. TX Data state generates the "00" command and null/gap logic sends a data word or delimiter. The FSM then unconditionally transitions (transition 2) to the TX Null 9 state. In this state, nine null commands "01" are clocked out to the null/gap logic which then inserts nine null symbols into the data stream. After the ninth null code, the FSM transitions to TX Data state if the TX FIFO is not empty (transition 1), or the FSM transitions to TX GAP state if the TX FIFO is empty (transition 3). In the TX Gap state, the FSM generates a GAP command during each data word clock interval, and the null/gap logic inserts GAP symbols into the data stream. When the TX FIFO is no longer empty, the FSM transitions back to TX DATA state (transition 4). In effect, when there are data or delimiter codes in the TX FIFO, the FSM in FIG. 5A slows the data rate by a factor of 10; i.e., from 100 Mbps to 10 Mbps.

When the frame type is Token Ring 16 Mbps, the type code is "000" (FIG. 3A), and command logic 31 selects FIG. 5B FSM. In FIG. 5B, there are four states (the same state is shown multiple times in FIG. 5B) for the FSM. TX DATA state generates command "00", which results in null/gap logic sending one nine-bit data word or a delimiter symbol from the TX FIFO to the access control 24 (FIG. 2). TX Null 5 state generates command "01" five times which results in the null/gap logic sending out five null symbols. TX Null 6 state generates command "01" six times which results in the null/gap logic sending out six null symbols. TX GAP state generates command "10" which results in the null gap logic sending out a gap symbol.

The numbered transitions defined in FIG. 6B define the input conditions that trigger the corresponding state transition in FIG. 6B, and result in action at the null/gap logic. Assuming the TX FIFO is empty, the FSM will be in TX GAP state and will stay in that state until the TX FIFO is not empty. In the TX Gap state, the FSM generates a GAP command during each data word clock interval, and the null/gap logic inserts GAP symbols into the data stream.

When the TX FIFO is no longer empty, the FSM transitions (transition 4) to TX DATA state 100. So long as the TX FIFO does not become empty, the FSM transitions through three more TX DATA states, three TX Null 5 states and a TX Null 6 state (in sequence the transitions 2A, 1A, 2B, 1B, 2C, 1C, 2D, and 1D). In each TX Data state, the FSM generates the "00" command, and null/gap logic sends a data word or delimiter from the TX FIFO. After each TX DATA state, the FSM unconditionally transitions (transition 2A, 2B and 2C) to a TX Null state. In each TX Null 5 state, five null commands "01" are clocked out to the null/gap logic, which then inserts five null symbols into the data stream. After the fifth null code, the FSM transitions to a TX Data state if the TX FIFO is not empty, or the FSM transitions to TX GAP state if the TX FIFO is empty (transitions 3A, 3B, 3C). At TX DATA state 102, the unconditional transition 2D is to a TX Null 6 state. In each TX Null 6 state, six null commands "01" are clocked out to the null/gap logic which then inserts six null symbols into the data stream. After the sixth null code, the FSM transitions to a TX Data state 100 if the TX FIFO is not empty, or the FSM transitions to TX GAP state if the TX FIFO is empty (transition 3D). In effect, the FSM working with the null/gap logic inserts 21 null symbols for every 4 data words. Thus, 4 out of 25 words or symbols in the data stream are data words from a data frame. This equates to a 6.25 to 1 data transmission rate reduction; i.e., from 100 Mbps to 16 Mbps.

During transmission, the nine-bit TX data words from the node interface, shown in FIG. 4A, go to the transmit path 34 (FIG. 2), which is shown in detail in FIG. 7A. In FIG. 7A, the 9-bit TX data word is received by the start/end of frame detect 48 and the frame check sequence. Detector 48 is looking for the frame start delimiter SDEL and the frame end delimiter 1 0000 1101. When the SDEL is detected, detector 48 enables the Frame Check Sequence (FCS) generate logic 50. FCS logic 50 receives octets with a "0" tag bit as they are clocked through the null/gap logic by TX Clock, passes the octets and tag bit to the link interface in FIG. 8, and adds the Frame Check Sequence at the end of the data frame. Detector 48 detects the end of the frame when it detects EDEL.

Figure 8:
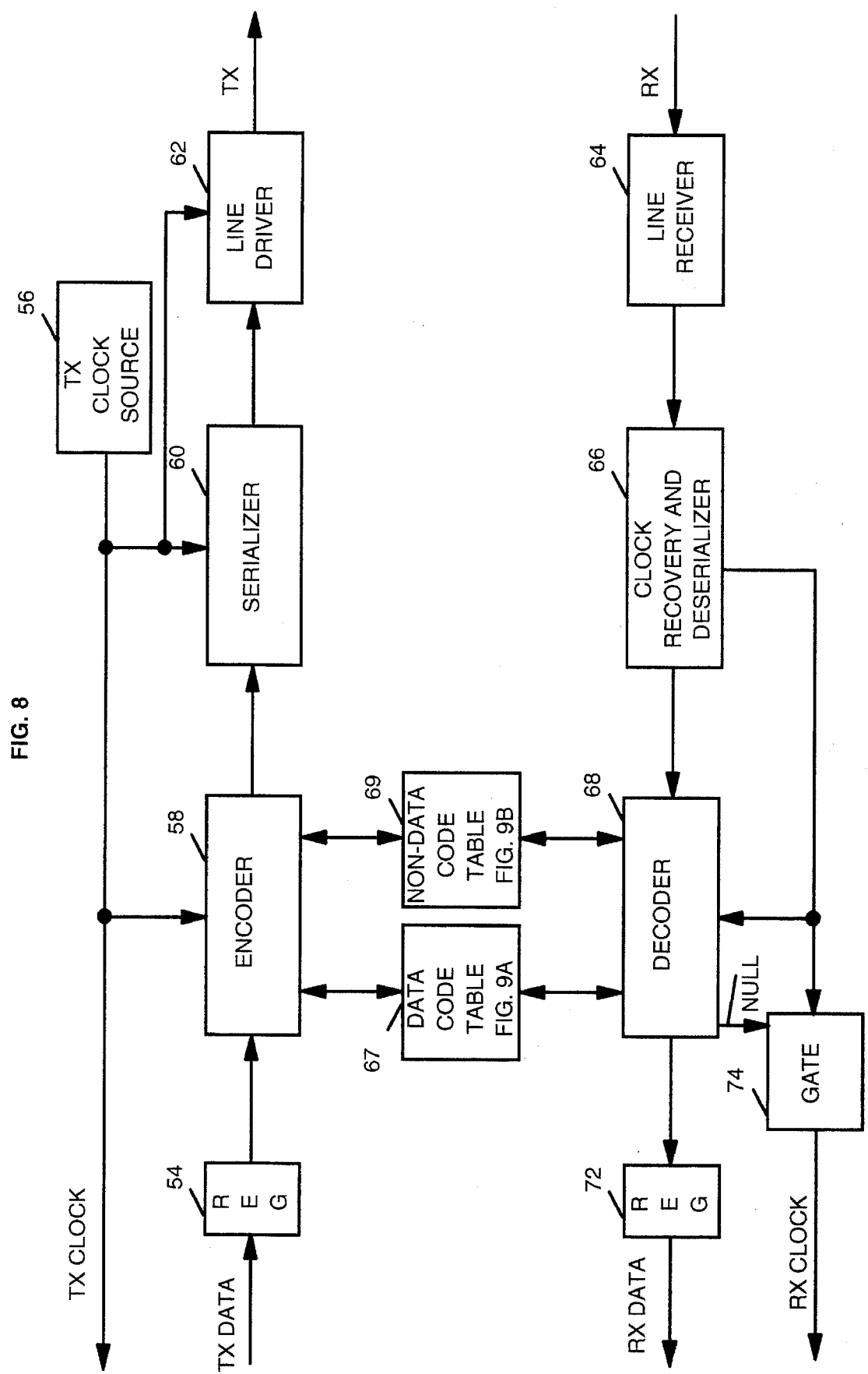
FIG. 8 illustrates the implementation of the link interface 22 in FIG. 2.

In FIG. 8, the nine-bit words in the TX-Data stream are received at register 54. TX Clock from TX Clock source 56 controls the clocking of data words from the FCS generate logic 50 in FIG. 7A to register 54 in FIG. 8. Encoder 58 reads the nine-bit words (eight bits plus a data or non-data tag bit) from register 54, and encodes the non-data symbols (delimiter codes, null codes and gap codes) and the data bytes, or octets, into a 4/5 code for transmission.

FIGS. 9A and 9B illustrate the contents of the data code table 67 and the non-data code table 69, respectively. These tables are used by encoder 58 to make the 4/5 code conversion. Each half octet, or data nibble, of each data octet is converted to a 5-bit code per the table in FIG. 9A. Notice that the tag bit 0 with each data octet is not encoded. A data octet is thus converted to a 10-bit word for transmission.

The prefix delimiter code, the start delimiter code for each frame type, the end-of-frame delimiter code and the null and gap codes are converted to a 10-bit code by encoder 58 using conversion table 69. The 5-bit code for an escape character is added to each 5-bit code word to make up the 10-bit word to be transmitted for these non-data symbols.

The ESC (escape) code has the unique property of being recognizable anywhere in a bit stream. Therefore, it is useful in delineating the non-data symbols in the data stream. Also, since all frames start with SDEL which contains the ESC code, it is useful in establishing alignment for detecting octets.

From encoder 58, the 10-bit TX word (data or non-data symbol) is serialized by serializer 60, and sent out on the link by line driver 62. TX Clock source 56 provides the timing for the serialization of the TX words and the transmission of the bits.

Since the link is full duplex, the node is also full duplex in that the RX words must be asynchronously processed while TX words are being transmitted. Accordingly, line receiver 64 receives RX bits from the line driver at the opposite node on the link. The RX data stream is converted to 10-bit RX words by deserializer 66. The deserializer also recovers the clock signal from the RX bits, and generates the RX Clock signal used by the adapter in processing RX data and non-data symbols.

Figure 7B:
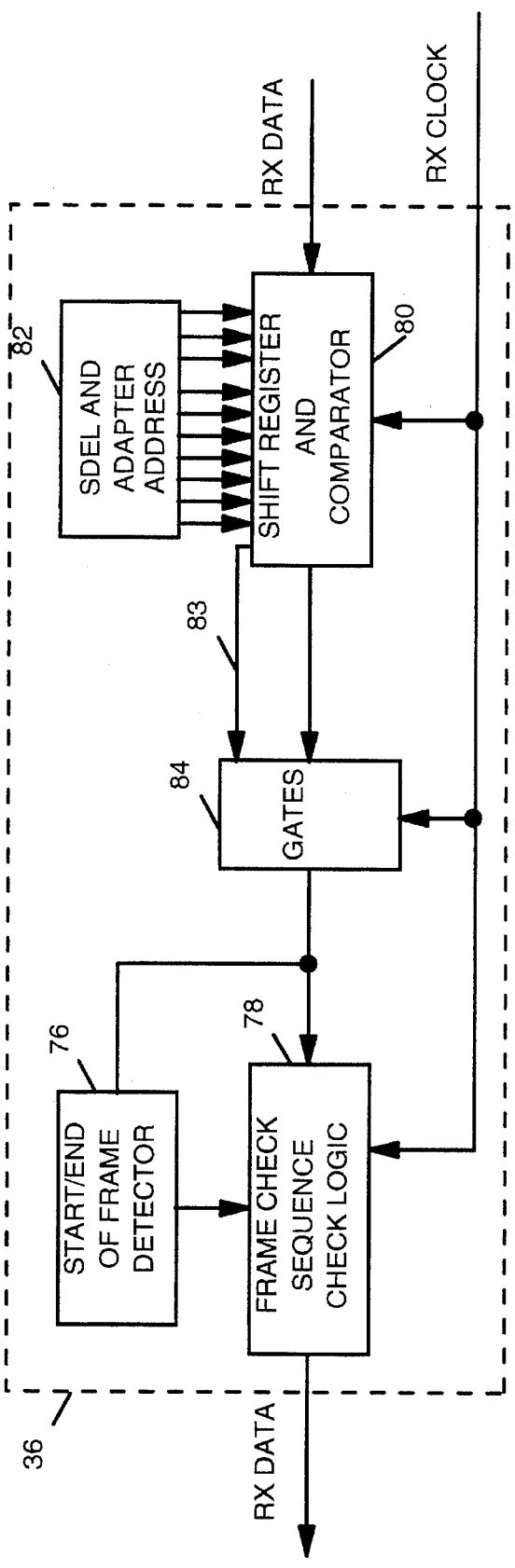
FIG. 7B shows the implementation of the receive path 36 in FIG. 2.

Decoder 68 performs the inverse role of encoder 58. When decoder 68 does not detect an ESC code, the decoder uses data code table 67 to convert the 10-bit word back to a data byte or octet, plus a tag bit. When Decoder 68 detects an ESC code, it decodes the non-data symbol as the PDEL, SDEL, EDEL, null or gap code using table 69. Decoder 68 passes the nine-bit data word (tag bit plus data octet), the PDEL, SDEL, EDEL, null and gap codes to register 72. The null code, when detected, inhibits gate 74. Normally, gate 74 passes RX CLOCK from clock recovery 66. However, the null code, or null symbol, decoder 68, blocks RX CLOCK from reaching shift register 80 (FIG. 7B). Therefore, the null symbol is not loaded into the shift register 80. In effect, the decoder 68, acting through gate 74, separates or strips null codes from the RX Data stream.

The receive path 36 of the access control is shown in FIG. 7B. In the receive path, the nine-bit RX-Data word is loaded into shift register and comparator 80 from register 72 (FIG. 8) by the RX Clock. The capacity of the shift register is 10 nine-bit words. Comparator 80 is looking for the SDEL and the adapter address in the data frame by comparing SDEL codes and the address in the received data frame to SDEL codes and the node address in register 82. If the node is an end node, the adapter will usually have a predefined adapter card address in register 82. Otherwise, the node address may be loaded by system control software, or by network control software.

In the preferred embodiment, the left-most 4 lines from register 82 to comparator 80 are each 9-bit line connections passing the SDEL code for each frame type. From left to right, the 4 lines carry the SDEL code for ATM, Token Ring, FDDI and Ethernet, respectively. The remaining six, or right-most six, lines are each 8-bit line connections are address codes; the standard adapter or node address is 6-bytes long following the SDEL (start of frame codeword).

In an alternative embodiment, the left-most line from register 82 to comparator 80 is a nine-bit PDEL code. The left-most second line would be for a variable field having a programmable variable length "special field." The special field would then contain identifiers for frame type and other information for frame processing. Following the special field would be an SDEL. Order of comparison is: PDEL/ Special Field/SDEL/LAN Address, where the Special Field is of variable length. The lines from register 82 which are to the right of this third line would be eight-bit lines containing address information as before in the preferred embodiment.

If there is an address match between the received data frame and the node address in register 82, gates 84 are enabled by comparator 80 via signal line 83. The RX data octet plus tag bit, SDEL, EDEL and gap code are passed to the start/end of frame detector 76, and the Frame Check Sequence (FCS) check logic 78. If there is no address match, gates 84 are inhibited, and the RX Data dumps out the end of shift register/comparator 80.

Start/end of frame detector 76 enables FCS checking logic 78 when the SDEL code is received. After frame check logic 78, the octets plus tag bit go to the RX FIFO buffer 30 at the node interface. When detector 76 detects the end of frame EDEL code or a gap code, the FCS check logic performs the frame check operation. If the frame check is not successful, the EDEL or gap code is replaced by a bad end of frame codeword, 1 1111 1111, from check logic 78 to RX FIFO 30 (FIG. 4).

To illustrate the operation and advantages of the invention, some typical transmit and receive operations will now be described. In this exemplary operation, it is assumed that the present node being described is an end node; i.e., a work station computing system, and the node at the opposite end of the link is a network node containing a data transfer unit or switch fabric. When the system bus in the work station gets access to the adapter, it loads all, or a part of, the data frame into the TX FIFO buffer 28 (FIG. 4A) depending on the size of the TX FIFO buffer.

When the adapter initiates transmission of a data frame over the link, the interface logic 46 identifies the frame type from the frame description, and generates a unique SDEL code. The null/gap logic 33 decodes the data frame type from the SDEL code, and sends the frame type to the command logic 31. So long as the TX Buffer 28 contains data or delimiter symbols, FSM 32 issues appropriate null commands to insert null symbols in the data frame to adapt the data rate of the data frame to the data rate of the receiving link or node. When the TX buffer reaches empty, FSM 32 will generate a gap command and null/gap logic will send out gap symbols indicating a gap between data frames. If TX FIFO goes empty after an SDEL but before an EDEL, an error has occurred. The end-node has "underflowed" the adapter TX FIFO.

On the reception side of the adapter, RX data stream is constantly being received from the link. Decoder 68 decodes the RX 10-bit words into RX data words and non-data symbols. The null non-data symbols are stripped out of the data stream by decoder 68 inhibiting gate 74 to prevent the RX CLOCK signal from shifting bits into shift register 80. On the other hand, the nine-bit RX-Data words, including data octets plus tag bit, SDEL, EDEL and Gap codes are passed to and loaded into shift register/comparator 80 as timed by the RX CLOCK signal. If the RX data octets are in a data frame addressed to this node, the data bytes with tag bit are gated through FCS check logic 78, and into RX FIFO 30. When the system bus or switch fabric gets access to the adapter, it reads the data bytes from RX FIFO 30.

In effect, the inserting of null codes adapts the communication link data rate to a specific protocol data rate. The protocol data rate is determined by the frame type. The line data rate is the bit-rate provided by the line (100-Mbps in our embodiment). The actual data frame at a source (switch node or end node) is stretched during transmission by inserting null symbols. Upon receipt at a destination (switch node or end node), the adapter shrinks or compresses the stretched data frame back to actual data frame size by removing the null symbols.

While a number of preferred embodiments of the invention have been shown and described, it will be appreciated by one skilled in the art, that a number of further variations or modifications may be made without departing from the spirit and scope of our invention.

What is claimed is:

1. In a communication network for transmitting data frames of multiple types between a source and a destination in the communication network, each data frame type having a different data transmission rate, a method for adapting each transmitted data frame's data transmission rate to a network transmission rate of the communication network, said method comprising the steps of:

detecting a data frame type from a frame code in a data frame being transmitted from the source to the destination;

selecting a frame transmission rate for the data frame type detected by said detecting step;

stretching the data frame being transmitted by inserting a..plurality of null symbols in the data frame being transmitted to produce a stretched data frame with a stretched frame transmission rate matched to the network transmission rate; and transmitting the stretched data frame from the source to the destination at the network transmission rate.

2. The method of claim 1 further comprising the steps of:

receiving at the destination the stretched data frame including null symbols inserted by said stretching step;

decoding the stretched data frame to detect null symbols in the data frame; and compressing the stretched data frame by removing from the stretched data frame the null symbols detected by said decoding step whereby the data frame is restored to a data frame at the from transmission rate for the data frame's type.

3. The method of claim 1 further including the steps of:

generating a unique frame identifying the type of data frame being transmitted; and said detecting step decoding the unique frame code to detect the type of data frame being transmitted from the source to the destination.

4. The method of claim 3 wherein said unique frame codes are start delimiter codes and each data frame type has a unique start delimiter code.

5. The method of claim 1 wherein said stretching step comprises the steps of:

buffering data words that make up the data frame in a transmit buffer;

in response to the data frame type detected by said detecting step, providing a quantity of null symbols to be inserted between data words in the data frame; and gating each data word from the transmit buffer and gating the quantity of null symbols between data words as provided by said providing step whereby the stretched data frame is produced.

6. The method of claim 5 further comprising the steps of:

a buffer-empty detecting step detecting whether or not the transmit buffer has data words for transmission by said transmitting step and generating a buffer-not-empty signal or buffer-empty signal, accordingly; and in response to the buffer-empty signal and the buffer-not-empty signal from said buffer empty detecting step, inserting gap symbols for transmission by said transmitting step when the buffer is empty and until the buffer is not empty.

7. The method of claim 1 further comprising the steps of:

receiving at the destination the stretched data frame including null symbols inserted by said stretching step;

decoding the stretched data frame to detect null symbols in the stretched data frame;

gating data words in the stretched data frame to a shift register; and blocking said gating step in response to said decoding step detecting a null symbol whereby each null symbol is removed from the data frame as the data frame is gated to the shift register whereby the data frame is restored to a data frame at the frame transmission rate for the data frame's type.

8. In a communication node for transmitting a data frame, adapter apparatus for adapting data rate of the data frame to data rate of a "clear-pipe" communication network attached to the node, said apparatus comprising:

a buffer buffering data words and non-data symbols of the data frame to be transmitted;

a detector detecting from the non-data symbols the type of data frame being buffered by said buffer;

a switch responsive to the type of data frame detected by said detector, said switch inserting a quantity of predetermined non-data symbols between data words to produce a stretched data frame adapted to the data rate of the communication network; and state logic controlling the quantity of predetermined non-data symbols inserted between data words by said switch, the quantity depending upon the type of data frame detected by said detector and the data rate of the communication network.

9. The apparatus of claim 8 and in addition:

buffer empty detector detecting said buffer is empty or not empty and indicating an empty or not empty condition for said buffer;

said switch responsive to the not empty condition inserting null non-data symbols between each data word of the data frame; and said switch responsive to the empty condition inserting gap non-data symbols until said buffer empty detector indicates a not empty condition.

10. The apparatus of claim 8 wherein the communication network has a full duplex link and a full duplex node for receiving a received data frame asynchronously while transmitting a transmitted data frame, and said apparatus further comprises:

a decoder decoding the received data frame to detect predetermined non-data symbols inserted in the received data frame; and a logic device responsive to said decoder for stripping the predetermined non-data symbols from the received data frame.

11. The apparatus of claim 10 wherein said logic device comprises:

shift logic shifting the received data frame into a shift register; and gating logic inhibiting said shift logic in response to said decoder detecting each predetermined non-data symbol whereby each of said inserted predetermined non-data symbols is not shifted into the shift register and is thereby removed from the data frame as the frame is loaded into the shift register by said shift logic.

12. The apparatus of claim 11 wherein the predetermined non-data symbols are null symbols.

13. The apparatus of claim 8 and in addition:

a frame code generator generating unique frame codes identifying the type of data frame; and said detector decoding the unique frame codes to detect the type of data frame being buffered by said buffer.

14. The apparatus of claim 13 wherein said unique frame codes are start delimiter codes and each data frame type has a unique start delimiter code.

15. The apparatus of claim 13 and in addition:

a receiver receiving a received data frame;

a decoder decoding the received data frame to detect the unique start delimiter codes in the received data frame; and address detector responsive to unique start delimiter codes detected by said decoding means for detecting a destination address in the received data frame.

16. The apparatus of claim 8 wherein:

said state logic, responsive to the data frame type detected by said detector, selecting a predetermined number of null symbols to be inserted between each data word in the data frame; and said switch switching between passing from said buffer a data word to be transmitted by the node and passing the predetermined number of null symbols to be transmitted by the node between each data word.

* * * * *